May 30, 1933.    M. MORRISON    1,911,963
STEREOSCOPE
Filed Oct. 15, 1931    3 Sheets-Sheet 1
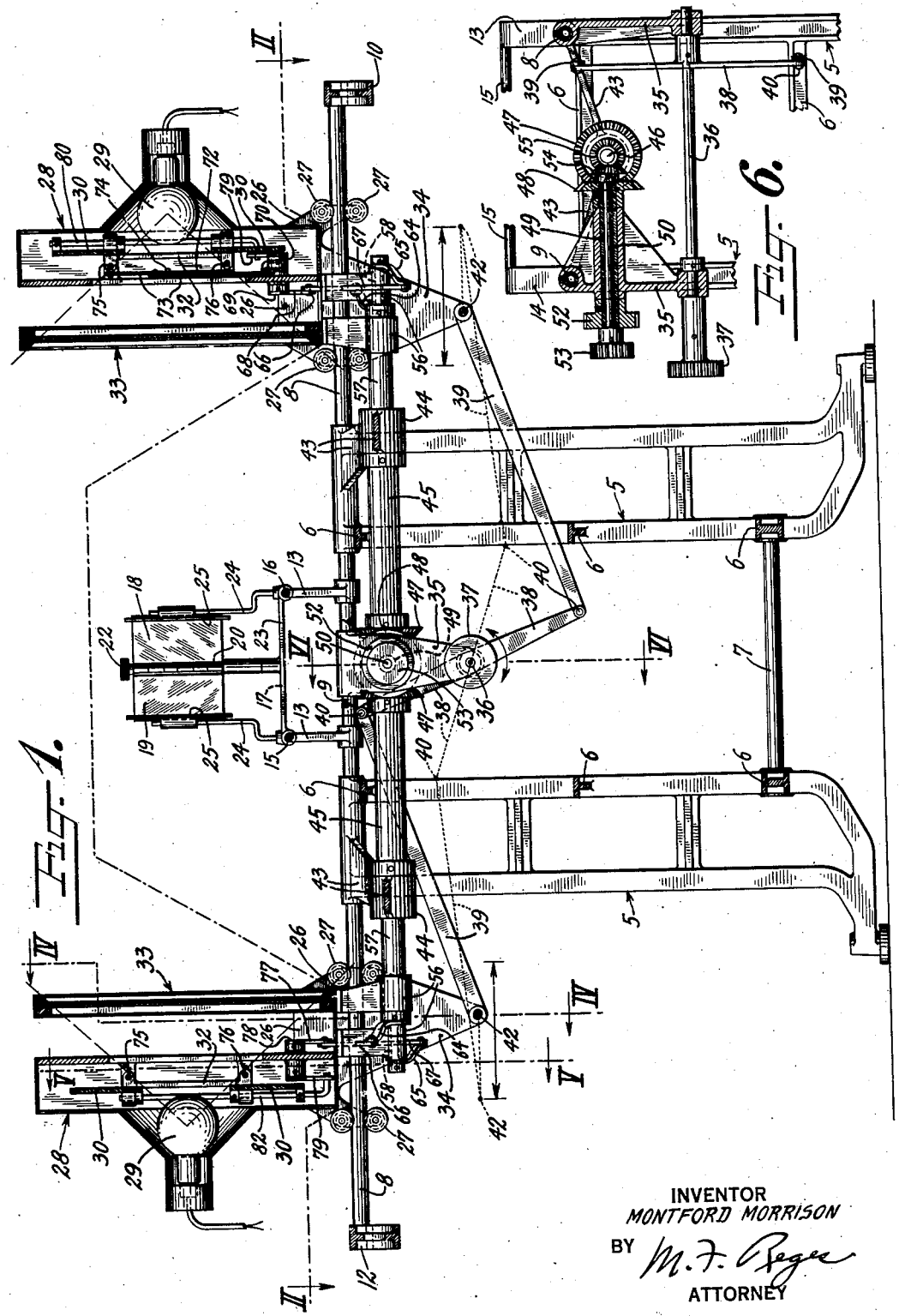
INVENTOR
MONTFORD MORRISON
BY
ATTORNEY May 30, 1933.  M. MORRISON  1,911,963
STEREOSCOPE
Filed Oct. 15, 1931  3 Sheets-Sheet 2
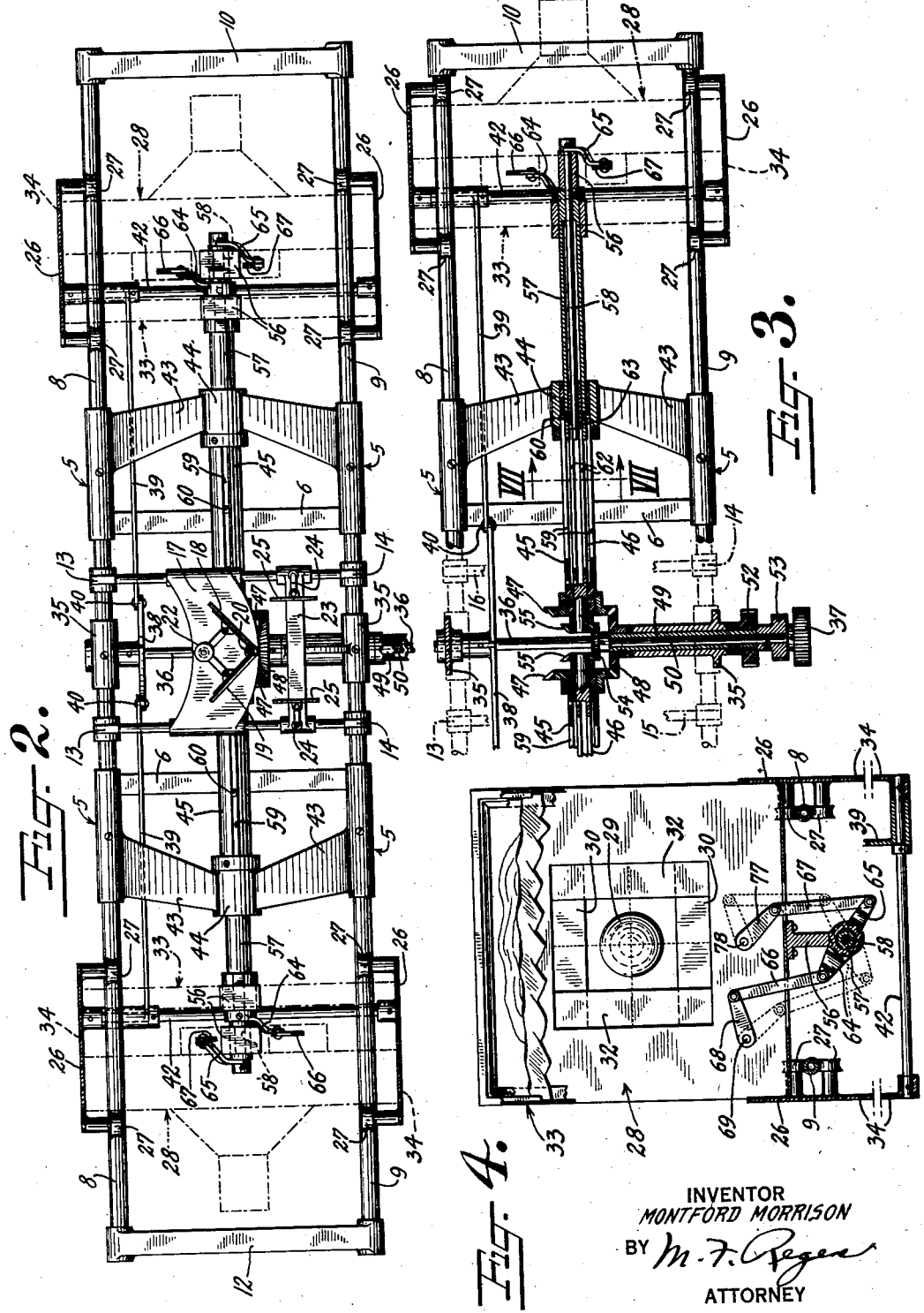
INVENTOR
MONTFORD MORRISON
BY
ATTORNEY May 30, 1933.                M. MORRISON                 1,911,963
                              STEREOSCOPE
                         Filed Oct. 15, 1931       3 Sheets-Sheet 3
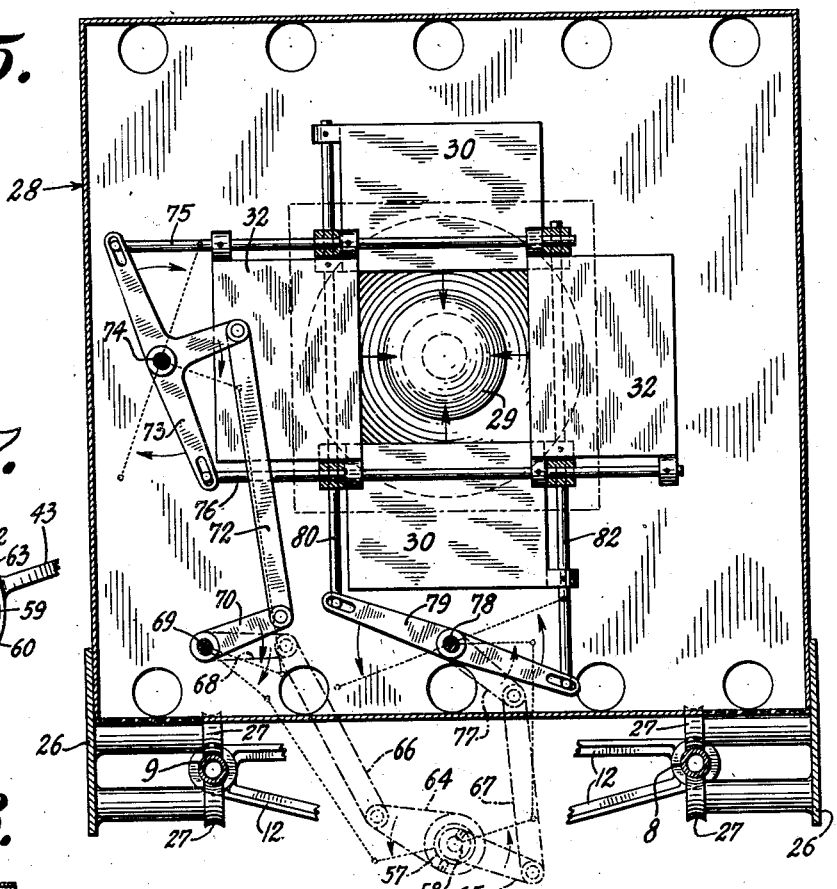
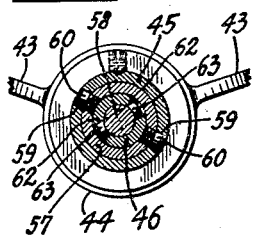
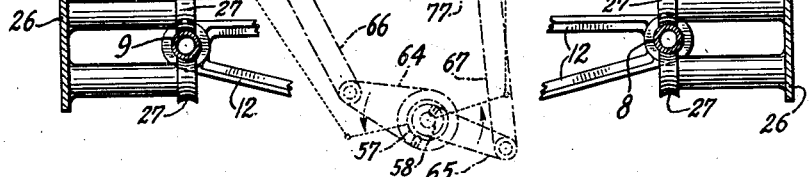
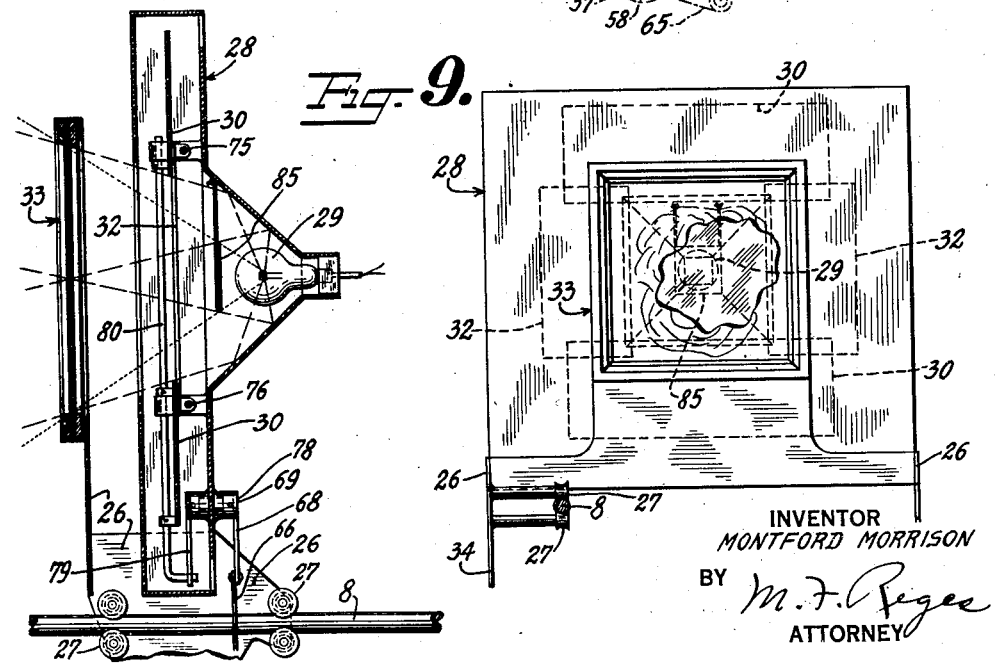
INVENTOR
MONTFORD MORRISON
BY
ATTORNEY Patented May 30, 1933

1,911,963

UNITED STATES PATENT OFFICE

MONTFORD MORRISON, OF MONTCLAIR, NEW JERSEY, ASSIGNOR TO WESTINGHOUSE X-RAY COMPANY INC., A CORPORATION OF DELAWARE

STEREOSCOPE

Application filed October 15, 1931. Serial No. 568,913.

My invention relates to stereoscopes of the general type utilized by the Roentgenologist for simultaneously viewing two radiographic pictures which have been taken of an object from two distinct angles in order that the pictures when viewed appear superimposed upon each other and stand out in relief.

In such devices a source of illumination is disposed in the rear of the radiographic pictures in order to illuminate the entire area thereof, but it occasionally happens that the observer desires to concentrate the illumination at some particular portion of the area of the film and exclude the illumination from the remaining portions. In devices known to the prior art light opaque shades have been utilized which are positioned between the viewing mirrors and the films. However, these shades are very fragile and must be individually controlled in order to restrict the illumination to the desired area of the films. This necessitates the observer removing his eyes from the viewing mirrors while adjusting the shades as well as several adjustments in order to finally restrict the illumination to the portion of the film at which a detailed study is desired.

It is, therefore, an object of my invention to provide a stereoscope in which adjustable shutters are employed to restrict the illumination reflected from the source to any desired area of the radiographic film.

Another object of my invention is the provision in a stereoscope of a control mechanism for simultaneously operating a pair of adjustable shutters to restrict the illumination from the source to any desired area of a radiographic film.

Another object of my invention is the provision of adjustable shutters in a stereoscope for restricting the illumination from the source to any desired area of the radiographic films and control mechanism for simultaneously operating the adjustable shutters from a fixed position.

Another object of my invention is the provision of a stereoscope in which adjustable shutters are utilized to restrict the illumination from the source to any desired area of the radiographic films and controlling mechanism readily operable by an observer without removing his vision from the viewing mirrors to simultaneously operate the adjustable shutters.

A further object of my invention is the provision of a stereoscope in which only reflected illumination from a suitable source is permitted to strike a radiographic film and in which adjustable shutters operable from a single position are disposed between the source of illumination and the radiographic film to restrict the reflected illumination from the source to any desired area of the radiographic film.

Still further objects of my invention becomes obvious to those skilled in the art by reference to the accompanying drawings wherein Figure 1 is a front elevational view in section of a stereoscope embodying the features of my invention, Figure 2 is a top plan view of my stereoscope partly in section taken on the line II—II of Fig. 1, Figure 3 is a fragmentary plan view in section of a portion of the structure shown in Fig. 2, Figure 4 is a sectional view taken on the line IV—IV of Fig. 1 looking in the direction indicated by the arrows with a portion thereof broken away to better show the various parts, Figure 5 is a sectional view taken on the line V—V of Fig. 1 on an enlarged scale, Figure 6 is a sectional view of a portion of the control mechanism taken on the line VI—VI of Fig. 1 looking in the direction indicated by the arrows, Figure 7 is a sectional view of a portion of the controlling mechanism employed with my stereoscope taken on the line VII—VII of Fig. 3, Figure 8 is a sectional view of a modified form of a portion of my stereoscope, and Figure 9 is a front view of the modification shown in Fig. 8.

Referring now to the drawings in detail I utilize a pair of uprights, one being shown at 5. These uprights are rigidly supported by laterally extending braces 6 which interconnect the uprights 5 and longitudinal bracings, such as shown at 7, may be employed between the section of each upright in order to increase the rigidity of the structure. A rectangular frame comprising longitudinally extending rods 8 and 9 and end members 10 and 12 is secured to the upper extremity of these uprights. Two pairs of lugs 13 and 14 extend upwardly from the longitudinal frame members 8 and 9 and a pair of longitudinally extending rods or shafts 15 and 16 interconnect the respective lugs 13 and 14.

A base member 17 is mounted upon these transverse rods 15 and 16 which is arranged to move longitudinally thereof and is provided with a pair of vertically adjustable viewing mirrors 18 and 19, the latter of which are adjustable about a vertical pivot 20, by means of a control knob 22.

A smaller base member 23 is likewise mounted for longitudinal movement upon the rods 15 and 16 and is provided with a pair of angular brackets 24 to which are affixed a pair of eye shades 25 for the purpose of shading the eyes of the observer during an examination.

A pair of base members 26 are mounted upon the longitudinally extending rods 8 and 9 and are provided with rollers 27 disposed above and below each of the respective rods 8 and 9 to enable these base members to be moved longitudinally thereof. A pair of illuminating boxes 28 are supported by the base member 26 and each of these boxes are provided with a suitable source of illumination, such as an incandescent lamp 29.

A pair of vertically adjustable light opaque shutters 30 and a pair of horizontally adjustable shutters 32 are disposed interiorly of these illuminating boxes. A film holder 33 is likewise supported by each of the respective base members 26 and is positioned in front of the illuminating boxes 28 a sufficient distance to enable the light from the respective sources 29 to strike the entire area of a radiographic film when secured to the respective film holders 33.

Each of these base members 26 are provided with a downwardly extending flange 34 and a similar pair of flanges 35 extends downwardly from the longitudinally extending rods 8 and 9, at approximately the center thereof. A rod or shaft 36 is suitably journaled in these latter lugs 35 and a control knob 37 rotates the shaft in either direction desired.

A link 38 is rigidly secured to the shaft 36 and a pair of link members 39 are pivotally connected at 40 to the outer extremity of the link member 38 and likewise pivotally connected at 42 to the downwardly extending lugs 34 of the respective base members 26. By this construction rotation of the control knob 37 and the shaft 36 moves the link members 38 and 39 and causes a simultaneous movement of the respective base members 26 longitudinally of the rods 8 and 9 toward and away from the transversely movable viewing mirrors 18 and 19.

It sometimes happens that, during a stereoscopic examination of a pair of radiograpic films which have been taken of an object from two distinct angles, it is desirable to study some detail portion of the film. When an occasion of this kind occurs it is of great importance to the observer to concentrate the illumination from the respective sources upon the desired portion of the radiographic film and to exclude the illumination from the remaining portions without removing his vision from the viewing mirrors.

In order to accomplish this result the vertically adjustable shutters 30 and the horizontally adjustable shutters 32 which are carried interiorly of each of the respective viewing boxes 28 may be adjusted to cause the light from the respective sources 29 to be restricted to the desired portion of the film, by a mechanism now about to be described.

A pair of brace members 43 extend between the uprights 5 and are provided centrally thereof with suitable bearings 44. A pair of concentrically disposed shafts 45 and 46 extend from each of these bearing portions to substantially the center of the frame member.

Each of the shafts 45 are provided with a bevel gear 47 both of which engage a bevel gear 48. The downwardly extending lug member 35, which forms a bearing for the end of the shaft 36 to which the control knob 37 is secured, is provided with a pair of concentric shafts 49 and 50, each of which may be rotated by a pair of concentric control knobs 52 and 53 respectively.

The shaft 49 has the bevel gear 48, which engages the bevel gears 47, rigidly secured thereto so that rotation of the shaft 49 by the control knob 52 rotates the respective bevel gears 47 and the longitudinally extending shafts 45. The shaft 50 which is rotated by the control knob 53 is also provided with a bevel gear 54 which likewise engages a pair of bevel gears 55 carried by each of the longitudinally extending shafts 46 in order to rotate these latter shafts when the control knob 53 is operated.

The respective base members 26 are each provided with a bearing portion 56 and a pair of concentric shafts 57 and 58 extend from these respective bearing portions 56 to the bearing portions 44 carried by the brace members 43. These latter two shafts are of slightly less diameter than the shafts 45 and 46 in order that the latter may telescopically engage the former to allow longitudinal movement of the base members 26 upon the respective rods 8 and 9. In order to transmit rotary motion of the respective shafts 45 and 46 to the respective shafts 57 and 58 I provide the shafts 45 with longitudinal slots 59 and the shafts 57 with a pair of laterally extending pins 60 which engage these slots 59. In a similar manner I provide the respective shafts 46 with a slot 62 which is also engaged by a laterally extending pin 63 carried by the shafts 58 which construction can be more readily appreciated by reference to Figure 7.

The rotation of the respective shafts 45 and 46 by the respective control knobs 52 and 53 is thus transmitted to the shafts 57 and 58 while enabling the respective base members 26 to perform longitudinal movement. Each of the shafts 57 are provided with a bell crank lever 64 and in a like manner each of the rods 58 are provided with a bell crank lever 65. The bell crank levers 64 are pivotally connected to a link member 66 and the bell crank levers 65 are likewise pivotally connected to a link member 67 as can be more readily appreciated by reference to Figures 4 and 5. As the mechanism of the adjustable shutters carried by each of the respective illuminating boxes 26 are identical in operation, the operation of one only will be described in detail.

Referring now more particularly to Figure 5 the lever 66 is connected to a bell crank lever 68 rigidly secured to a short shaft 69. A second bell crank lever 70 is likewise rigidly secured to the shaft 69 and in turn is provided with a link member 72 pivotally connected thereto. This latter link 72 is pivotally connected to a yoke member 73 which is arranged to partially rotate about a fixed pivot 74. A pair of rods 75 and 76 loosely engage the outer ends of the yoke member 73 and the rod 75 has one of the horizontally adjustable shutters 32 rigidly secured thereto and the other horizontally adjustable shutter 32 is rigidly secured to the rod 76. In this manner rotation of the yoke member 73 about its pivotal connection 74 causes movement of the shutter 32 carried by the rod 75 to the right, and the movement of the shutter 32 carried by the rod 76 to the left, as shown in the Figure.

The link member 67 is likewise pivotally connected to a bell crank lever 77 which is rigidly secured to a short shaft 78. A yoke member 79 is also rigidly secured to this shaft 78 and a pair of rods 80 and 82 also loosely engage the outer ends of this yoke member 79. One of the vertically adjustable shutters 30 is rigidly secured to the rod 80 while the remaining vertically adjustable shutter 30 is rigidly secured to the rod 82. In this manner rotation of the yoke member 79 about its pivot point, namely the shaft 78, will cause downward movement of the upper shutter 30 and upward movement of the lower shutter 30, as viewed from the Figure.

Movement, therefore, of the respective yoke members 73 and 79 will vary the size of the aperture through which the light from the respective sources 29 is projected outwardly from the viewing boxes 28.

Referring now more particularly to Figures 8 and 9 I have shown a viewing box carrying a set of adjustable shutters similar to that just described which is also provided with a reflecting screen 85. The purpose of this reflecting screen 85 is to prevent direct rays from the respective sources of illumination 29 from passing outwardly from the aperture provided by the adjustable shutters and enabling only restricted rays to pass therethrough. This feature per se is more fully shown and described in my copending application Ser. No. 554,506, filed August 1, 1931, and forms no part of the present invention other than in combination with the present invention.

The operation of my invention may be best understood by assuming a given problem. Assuming, therefore, that the adjustable shutter mechanism carried by the respective viewing boxes 28 are in the completely open position to give the largest aperture obtainable, and that a pair of radiographic films taken from two distinct angles are secured to the respective film holders 33, the operator gazes into the viewing mirrors 18 and 19 and moves the base member 17 to align the mirrors centrally of the respective films. The mirrors may then be adjusted by means of the control knob 22 until the respective pictures appear superimposed and stand out in relief.

The smaller carriage 23 may then be moved transversely of the main frame member until the shades 25 are in the desired position to prevent any illumination from the respective sources 29 interfering with the vision of the observer. The control knob 37 may then be rotated thus properly positioning the respective viewing boxes relative to the viewing mirrors longitudinally of the frame member rods 8 and 9 by means of the link member 38 and the respective link members 39. Assuming now that while studying the pictures some phenomenon of a particular portion of the anatomy which has been radiographed is noticed of which a more detailed study is desired and the operator desires to concentrate the illumination from the source upon that particular portion of the film, he rotates the control knob 52, in a counterclockwise direction which likewise causes counterclockwise rotation of the shaft 49.

Rotation of the shaft 49 in this direction will cause downward rotation of the left hand bevel gear 47 and upward rotation of the right hand gear 47 as viewed from Fig. 3. The respective shafts 45 and 57 will thus be rotated and cause downward movement of the respective bell cranks 64 (see Figs. 2 and 3). Although the direction of rotation of the right hand shafts 45, 57 is opposite to that of the left hand shafts 45, 57 downward movement of the respective bell crank levers 64 nevertheless occurs as they are positioned on opposite sides of the vertical axis of the respective shafts 57.

Downward movement of the respective bell crank levers 64 causes downward movement of the bell crank levers 68 by means of the link 66 (see Figs. 4 and 5). This movement of the bell crank 68 will cause downward movement of the bell crank 70 which causes the link 72 to rotate the yoke member 73 about its pivotal connection 74. The left hand horizontally adjustable shutter 32 is thus moved by the rod 75 towards the right and the right hand shutter 32 is moved by the rod 76 toward the left. This partially restricts the aperture through which the light from the respective sources 29 passes to the radiographic film carried by the holder 33. Having thus restricted the aperture in this direction the operator then rotates the control knob 53 also in a counterclockwise direction which causes counterclockwise rotation of the inner shaft 50 and the bevel gear 54.

This counterclockwise rotation is then transferred to the respective bevel gears 55 carried by the right hand and left hand shafts 46 and is transmitted to the respective shafts 58 through the pin connection 63. This rotation of the respective shafts 58 will cause upward movement of the right and left hand bell crank levers 65 in the same manner as previously described relative to the respective shafts 57 and bell crank levers 64. Upward movement of the bell crank lever 65 will cause upward movement of the bell crank lever 77 carried by the shaft 78 through the link connection 67. As the bell crank lever 77 is connected to the same shaft to which the yoke member 79 is secured the shaft 78 and yoke member 79 will be rotated in a counterclockwise direction as viewed from Figure 5. This will, therefore, cause the rod 80 to move the upper vertically adjustable shutter 30 downwardly and the lower shutter 30 upwardly to thus further restrict the size of the aperture.

Although I have described individually the operation of both the vertically and horizontally adjustable shutters in response to actuation of the respective control knob 52 and 53 for the sake of simplicity it must be appreciated that they may readily be operated simultaneously by the operator by grasping both the knobs as rotation thereof in the same direction causes identical operation of the shutters. For example, rotation of both knobs in a counter-clockwise direction brings both vertical and horizontal shutters toward each other to restrict the illuminated area of the films and rotation in a clockwise direction enlarges the area by causing simultaneously movement of the vertical and horizontal shutters away from each other. In this manner the reflected illumination is restricted to substantially any desired band of illumination over a horizontal or vertical area of the film.

Assuming now that the observer desires to move the respective base members 26 carrying the illuminating boxes 28 and film holders 33, closer or farther away from the viewing mirrors, he need merely rotate the control knob 37 in the desired direction to cause this movement. The setting of the respective adjustable shutters would not be disturbed by this movement due to the telescopic engagement of the respective shafts 57 with the respective shafts 45 through the slot 59 and pin 60 which allows this movement without causing rotation of these respective shafts.

In a similar manner the inner concentric shafts 46 and 58 are not disturbed due to their telescopic engagement and the driving connection between the slot 62 and pins 63.

It can, therefore, be readily seen that I have provided adjustable shutters which are utilized to restrict the illumination from a suitable source projected upon a radiographic film and that these shutters may be simultaneously controlled to restrict the illumination from the source to any desired portion of the area of the radiographic film. The control mechanism is so constructed that longitudinal movement of the film holders and illuminating boxes relative to the supporting frame may be readily accomplished without in any way disturbing the adjustable shutter control mechanism and that the latter may be operated by the observer to simultaneously adjust the shutters without removing his vision from the viewing mirrors.

Although I have shown and described one embodiment of my invention I do not desire to be limited thereto as various other modifications of the same may be made without departing from the spirit and scope of the appended claims.

What is claimed is:

1. In a stereoscopic device, a supporting member, an illuminating box provided with a source of illumination, a pair of vertically adjustable shutters and a pair of horizontally adjustable shutters carried by said illuminating box, a film holder carried by said supporting member and disposed in front of said illuminating box and adjustable shutters a distance sufficient to allow the illumination from said source to be reflected over the entire area of said film holder when said shutters are in their completely opened position, and controlling mechanism operable to simultaneously move each pair of said adjustable shutters and to simultaneously operate both pairs of said shutters to restrict the reflected illumination from said source to substantially any desired horizontal or vertical area of said film holder.

2. In a stereoscopic device, a supporting member, a pair of viewing mirrors carried by said supporting member, an illuminating box provided with a source of illumination and adjustable shutters for restricting the illumination from said source, a film holder disposed between said illuminating box with its adjustable shutters and said viewing mirrors, controlling mechanism in juxtaposition with said viewing mirrors operable to move said illuminating box toward and away from said viewing mirrors, and control mechanism in juxtaposition with said first mentioned control mechanism for simultaneously operating each pair of said adjustable shutters to restrict the illumination from said source to substantially any desired horizontal or vertical area of said film holder.

3. In a stereoscopic device, a supporting member, a pair of viewing mirrors mounted upon said supporting member and arranged to move transversely thereof, a pair of illuminating boxes provided with a source of illumination, a pair of shutters adjustable vertically of said illuminating boxes, a pair of shutters adjustable horizontally of said illuminating boxes, a pair of film holders disposed between each of said illuminating boxes and said viewing mirrors and mechanism controllable by the operator for simultaneously adjusting the horizontal and vertical shutters of each of said illuminating boxes to restrict the illumination from said source to substantially any desired horizontal or vertical area of said film holders.

4. In a stereoscopic device, a supporting member, a pair of viewing mirrors mounted upon said supporting member and arranged to move transversely thereof, a pair of illuminating boxes provided with a source of illumination and adjustable shutters carried by said supporting member, a film holder mounted upon said supporting member between each of said illuminating boxes and said viewing mirrors, controlling mechanism to simultaneously move said illuminating boxes with their respective shutters and said film holders toward or away from said viewing mirrors, and controlling mechanism for simultaneously operating the adjustable shutters of each of said illuminating boxes to restrict the light from said illuminating boxes to substantially any desired horizontal or vertical area of said film holders.

5. In a stereoscopic device, a supporting member, a pair of viewing mirrors movable transversely of said supporting member and adjustable about a vertical axis, a pair of base members carried by said supporting member simultaneously movable longitudinally of said supporting member, an illuminating box provided with a source of illumination and adjustable shutters carried by each of said base members, a photographic film holder carried by each of said base members and disposed between said illuminating box with its adjustable shutters and said viewing mirrors to enable the illumination from said source to be reflected upon said film holder and controlling mechanism for simultaneously operating the adjustable shutters of each of said illuminating boxes to restrict the reflected illumination from said source to substantially any desired horizontal or vertical area of said film holder.

6. In a stereoscopic device, a supporting member, a pair of viewing mirrors mounted upon said supporting member and arranged to move transversely thereof, a pair of illuminating boxes provided with a source of illumination and adjustable shutters carried by said supporting member, a reflecting screen carried by said illuminating boxes disposed between said source of illumination and said adjustable shutters to cause only reflected illumination to pass between said adjustable shutters, a pair of film holders carried by said supporting member and positioned between said illuminating boxes and their respective adjustable shutters to enable the reflected illumination from said source to be uniformly distributed over said film holders and controlling mechanism for simultaneously operating the adjustable shutters of each of said illuminating boxes to restrict the illumination from said source to substantially any desired horizontal or vertical area of said film holders.

7. In a stereoscopic device, a supporting member, a pair of viewing mirrors mounted upon said supporting member and arranged to move transversely thereof, a pair of illuminating boxes provided with a source of illumination and adjustable shutters carried by said supporting member and simultaneously movable thereupon toward and away from said viewing mirrors, a pair of film holders disposed between said viewing mirrors and said illuminating boxes with their respective adjustable shutters, and control mechanism disposed in juxtaposition with said viewing mirrors for simultaneously operating the adjustable shutters of said illuminating boxes.

8. In a stereoscopic device, a supporting member, a pair of viewing mirrors mounted upon said supporting member, a pair of illuminating boxes provided with a source of illumination, a pair of shutters adjustable vertically of said illuminating boxes, a pair of shutters adjustable horizontally of said illuminating boxes, a pair of film holders disposed between each of said illuminating boxes and said viewing mirrors and controlling mechanism disposed in juxtaposition with said viewing mirrors for simultaneously operating the vertically adjustable shutters and the horizontally adjustable shutters of each of said illuminating boxes.

9. In a stereoscopic device, a supporting member, a pair of viewing mirrors mounted upon said supporting member, a pair of illuminating boxes provided with a source of illumination, a pair of shutters adjustable vertically of said illuminating boxes, a pair of shutters adjustable horizontally of said illuminating boxes, a pair of film holders disposed between each of said illuminating boxes and said viewing mirrors, spaced concentric control knobs disposed adjacent said viewing mirrors, mechanism connecting said control knobs to said horizontal and vertical shutters one of said knobs operating a portion of said mechanism to simultaneously operate the vertically adjustable shutters, and the other of said knobs operating the remaining portion of said mechanism to simultaneously operate the horizontally adjustable shutters of each of said illuminating boxes to restrict the illumination from said source to substantially any desired horizontal or vertical area of said film holders.

10. In a stereoscopic device, a supporting member, a pair of viewing mirrors mounted upon said supporting member, a pair of illuminating boxes provided with a source of illumination and adjustable shutters carried by said supporting member and simultaneously movable thereupon toward and away from said viewing mirrors, a pair of film holders disposed between said viewing mirrors and said illuminating boxes with their respective adjustable shutters, control mechanism carried by said supporting member comprising concentric shafts extending longitudinally of said supporting member and provided with a telescopic engagement therebetween to cause movement of said illuminating boxes toward and away from said viewing mirrors, and spaced concentric control knobs disposed adjacent said viewing mirrors and operably connected to said shafts for simultaneously operating the adjustable shutters of each of said illuminating boxes.

In testimony whereof, I have hereunto subscribed my name this 8th day of October 1931.

MONTFORD MORRISON.